United States Patent [19]
Wefers et al.
[11] 3,927,303
[45] Dec. 16, 1975

[54] INFORMATION EVALUATION MEANS

[75] Inventors: Norbert Wefers; Uwe Militz; Uwe Unglaube, all of Berlin; Joachim Schwarzkopf, Oldenburg, all of Germany

[73] Assignee: Nixdorf Computer AG, Paderborn, Germany

[22] Filed: Feb. 22, 1973

[21] Appl. No.: 334,643

[30] Foreign Application Priority Data

Feb. 22, 1972 Germany ............................ 2208309

[52] U.S. Cl. .................... 235/61.11 E; 235/61.12 N
[51] Int. Cl.² ...................... G06K 7/10; G06K 19/06
[58] Field of Search 235/61.11 E, 61.11 D, 61.12 N; 340/146.3 Z, 146.3 K, 146.3 F; 250/555, 566

[56] References Cited

UNITED STATES PATENTS

| | | | |
|---|---|---|---|
| 3,286,233 | 11/1966 | Lesueur | 340/146.3 Z |
| 3,303,469 | 2/1967 | Perotto | 340/146.3 Z |
| 3,309,667 | 3/1967 | Feissel et al. | 340/146.3 Z |
| 3,354,432 | 11/1967 | Lamb | 340/146.3 Z |
| 3,562,494 | 2/1971 | Schmidt | 235/61.12 N |
| 3,671,722 | 6/1972 | Christie | 235/61.12 N |
| 3,744,026 | 7/1973 | Wolff | 235/61.11 E |

*Primary Examiner*—Daryl W. Cook
*Attorney, Agent, or Firm*—Gifford, Chandler & Sheridan

[57] ABSTRACT

Method of evaluating information in the form of line-coded grouped information bits, and to a coding arrangement device for presenting information for evaluation by such method.

19 Claims, 3 Drawing Figures

INFORMATION EVALUATION MEANS

BACKGROUND OF THE INVENTION

The invention relates to a method of evaluating information in the form of grouped information bits, consisting of mutually parallel, single color lines of varying width, printed on an information carrier according to a preestablished coding, evaluation being affected by means of a manually movable reading stylus which is carried along over the groups of lines in a scanning movement and which is connected with an opto-electrical converter which provides signals which indicate the varying contrast between the information carrier and the lines in a time sequence corresponding to their distribution and which are fed into a signal recognition device. Furthermore, the invention relates to a device for presenting information for evaluation by the method and circuitry for applying the method.

Methods of this kind are, for example, used for evaluating merchandise labels in a label reader. In this case, manual reading styli are generally used, which irradiate an information carrier with light and receive the reflected light which, as a result of the scanning movement, is modulated by the information bits and pass it on to one or more photo-sensitive receivers. These receivers are then followed by signal recognition devices which evaluate the information-modulated signals in such a way that the information bits, for example decimal figures or alphanumerical symbols, become available in their original mode of presentation.

Also, various methods are already known for presenting the information on information carriers by line coding, but these are subject to more or less serious disadvantages. Thus, for example, it is possible to make use of markings with different colors, wherewith, however, particularly high expense is involved for optical receiver systems with varying spectral sensitivity and the pertinent electronic evaluation circuits. Also, these receiver systems must be adjusted precisely with respect to the positions of their various optical parts. In addition, the polychrome code symbols must be applied to the information carrier by a very expensive printing process.

It is also a known practice to vary the information bits only by changing the width of the marks and thus to utilize a single color for the marks, but this provides too low a density of information, any increase in which leads to unsatisfactory reliability of signals.

Regardless of what variations in color or widths of mark are used for mark coding, all of the heretofore known methods have the common problem that the manually operated scanning movement of the reading stylus over the information carrier does not, of course, take place at constant speed. In fact, in most cases, it is found that, immediately after the reading head has been placed on a surface carrying the information carrier or on the information carrier itself, there is a very rapid acceleration which is decreased only during the scanning motion across the label in question. The accelerations may be such that they lead to differences in speed corresponding to a factor of 10. However, since with monochrome coding with variable line widths the values of line widths established when scanning are important to fully acceptable signal recognition, an errorless evaluation of the respective line widths during scanning is indispensable, and variation of speed during scanning obviously makes such correct evaluation most difficult to achieve.

The problem could be avoided by making use of varying line widths with extremely great differences, so that a certain variation in scanning speed would still always give the right result. However, this would lead to a very low data density, and the data carriers and labels would become too large.

It is also a known practice, as disclosed in German Application No. 2,032,240 in connection with strictly binary information presentation, to evaluate only the transitions between contrast levels of neighboring information bits, for the purpose of making the information carrier smaller and condensing the data carried thereon. While this procedure makes it possible to scan the information bits at varying speeds, only the presentation of binary information bits is possible because of its peculiar principle of evaluation, so that, compared with information presentation in which the width of the information bit is also used so that more than two different information values can be represented, practically no high data density is attainable.

Another known method is disclosed in German Application No. 1,239,512 and works with a binary presentation by means of differently colored information bits and requires two photocells for scanning, the first of which is sensitive to both colors and the second sensitive to only one. Since the binary information bits are represented by different colors, these bits may all have the same width, so that the first photocell delivers a timed signal during scanning and synchronization of the result with the scanner is not necessary. This method, also, has the disadvantage of limited information density because of only two possible information values and requires great expense, particularly for scanning.

It is the object of the invention, in connection with manual scanning of monochrome line width-coded information without increased expense for the scanner itself, to eliminate the undesired effect of varying speed of the scanner and thus to permit arbitrary variation in scanning speed, so that an increase, for example, in scanning speed to ten times the initial value while retaining the advantage of relatively inexpensive scanning apparatus of high data density, thereby without impairing the accuracy of signal recognition.

SUMMARY OF THE PRESENT INVENTION

A method of the type initially mentioned is, according to the invention, so designed for the solution of this problem that the signals are also compared with a timed signal of constant frequency, that the results of comparison are stored for a predetermined time which corresponds at least to the movement of the reading stylus over a predetermined number of marks, and that, from the comparison results which characterize the speed of movement of the reading stylus, signals are generated within the area of the signal recognition device which characterize the width of the lines scanned during the predetermined time.

By this method it is possible continuously to generate a single during the scanning movement which indicates the speed of the reading stylus. Because the signals provided by the reading stylus are compared with a timed signal of constant frequency, the results of the comparison contains information which characterizes the speed of movement of the reading stylus. For the duration of the respective output signals from the reading stylus, the arriving time pulses are counted, so that the count in each case is inversely proportional to the speed of movement of the reading stylus. If this procedure is carried out for a predetermined number of scanned marks, a sequence of line-width signals can be obtained, from the interrelation of which or the relation to a fixed predetermined value, the actual width of the scanned lines can be evaluated, for, according to the predetermined coding, one can start with a known relation of the line-widths to one another.

Also, the improvement in precision obtained by the method according to the invention is dependent on how rapidly the scanning speed varies. Thus, very good precision is possible with a first embodiment of the idea of the invention if the result of comparison is stored until scanning of the next subsequent line has been completed and if the signal resulting from scanning each individual line is then again compared with the timed signal. With this embodiment of the method, the speed is redetermined for every scanned line, so that the exact width can exactly be determined for each individual subsequent line. Thus, the result is much more accurate than is possible with determination of speed over a range of several lines.

One factor which may cause some inaccuracy in signal recognition is due to the fact that, in mass production, the lines are put on the labels by a printing process which has certain tolerances. An absolute value must be set for these tolerances, independent of the actual width of the line. This means that a wider line is printed with a relatively greater accuracy than a narrower one. For that reason, the scanning time for the narrowest possible line is expediently not used for comparison and determination of speed, but instead the results of comparison of the narrowest line present is fed into an averaging circuit, together with the result of comparison for the immediately preceding line, and the resultant average is used to generate a signal which characterizes the line width. Because of this averaging procedure, it becomes possible to compensate tolerance errors which have the greatest effect with the narrowest lines.

A second, alternative, possibility of carrying out the procedure according to the invention brings an even higher precision and reliability of character recognition. This extension of the invention is applied to groups of lines of a predetermined width and number of lines, in that the results of comparison of the lines belonging to a group of lines, are stored after the line-group has been scanned and that the signal obtained by scanning each individual line is compared with a signal obtained, in each case, by scanning the respective group.

When the comparison procedure is carried out for the predetermined number (for example, three) of scanned lines, a sequence of line-width signals can be obtained, from the relation of which to the line-group signal obtained by scanning the entire line-group, the actual width of each individual scanned line can be determined. According to the previously established coding, it is possible, as has been stated, to start with a known relation of line-widths to the width of the line-group, so that the individual line-widths can be assigned to predetermined classes, relative to the line-group width. The group line signal, in this extension of the invention, provides a very accurate measure in relation to the line-width signals. However, it has a component which depends on the average speed with which the line-group was scanned. The derived scale would best be applied to the line in the center of the line-group, because precision will have a tendency to decrease toward the beginning and the end of a complete scanning operation.

Now, the reliability of the evaluation scale can be improved even more if the line-group signal is stored and, before comparison with the signal obtained by scanning each individual line, is fed to an averaging device together with a signal characterizing at least a part of the width of at least one neighboring line-group.

As a further extension of the idea of the invention, the evaluation of individual marks is carried out in such a way that the averaging, in each case, takes place with a part of the width of a neighboring line-group which is proportional to the respective displacement, from the central position, of the line being evaluated in its line-group.

Thus, a scale for evaluation is based on a weighted averaging of neighboring line-group signals. The farther the line to be classified is removed from the center of its line-group, the greater will be the consideration given to the preceding or succeeding line-group signal in the averaging process. By means of this method, the speed component superimposed on the line-width signals is largely eliminated and, even with acceleration of more than 60 $cm/sec^2$, an errorless classification can be made.

At the beginning of the scanning procedure, a relatively high acceleration may occur because of the manual movement of the reading stylus, because experience has shown that this is the case with all manual movements. The magnitude of the initial acceleration depends, among other factors, on the point of application of the reading stylus on the information carrier. For example, in the evaluation of the second scanned mark, there is a danger that the value obtained from scanning the first mark and used as a measure of speed for scanning the second mark is too large, or that, with the second possible manner of evaluation, where signals characterizing the width of the line-groups are generated, the ratio of the line-width signal to the line-group signal is falsified, thus leading to incorrect classification. To avoid such an error, the evaluation can be carried out in such a way that at least the result of comparison derived from the scanning of the first line with respect to the value characterizing the speed of motion is diminished by a predetermined percentage which corresponds approximately to the acceleration of the manual scanning motion in the region of the respective line. This value can be established by experimental motion analysis. Particular advantages are gained by this further extension of the invention, if this diminution corresponding to the time-wise decreasing acceleration is applied not only to the first scanned line but also to succeeding lines, wherewith the amount of the decrease becomes ever smaller, corresponding to the respective accelerations. In this way, the signal evaluation can be fitted to a given movement characteristic quite accurately.

The amount of diminution should not be chosen too large, for then, in case of a possible scanning without large acceleration values, the speed scale for the respective succeeding line can become too small. In order to avoid this problem when the above-described measure is applied, the method according to the invention in the form described can expediently be extended further in that the diminution takes place as a function of a signal which characterizes a predetermined minimum time or minimum path between application of the reading stylus to a surface in the plane of the scanning movement and scanning of the first line.

This procedure makes it possible to apply the reading stylus before scanning even to a point situated outside the information carrier or label. If then a minimum time elapses between application of the reading stylus, which can be evaluated by a special signal, and the actual beginning of scanning, a deduction may be made to the effect that a motion was carried out for a definite minimum path or over a preliminary field. However, the initial acceleration of manual scanning is largely eliminated by this movement, so that character identification can be carried out without corresponding errors. If this preliminary field movement is characterized by a particular signal, this signal will expediently do away with the previously described diminution of the value which characterizes the speed of motion.

The size of a data carrier, for example a label, is in many cases limited. If the label is pasted onto a larger surface, which then forms the preliminary field for scanning, the movement inside this field over the contrast threshold formed by the edge of the label or a margin established there may lead to an erroneous simulation of a code line. As a result, character identification could erroneously be triggered. With the last described embodiment of this invention, this can be avoided for this evaluates the time or path required for traversing the preliminary field. If this time is a multiple of the time which elapsed during passage over the label boundary and which led to simulation of the first mark, a criterion for resetting the control mechanism of the character identification device to a state of rest may be derived from a comparison with the time required for scanning the subsequent blank area of the label. This assures that, when the first actual line to be evaluated is reached, there will be no already stored signals in the character identification device.

This also offers the opportunity to decide at what point the reading stylus was applied, since the resetting of the signal evaluator to the initial state takes place only when it is applied outside a label. In this connection, it is also conceivable initially to print a line at the edge of the data carrier or label, the scanning of which would provide assurance that the scanning element is actually on the data carrier and is scanning the subsequent data-free area. This criterion can be stored, so that this offers the possibility of applying the diminution to the speed value gained by scanning the first line, dependent for example on the magnitude of the stored resetting signal, or not applying the full amount of the diminution. In this way character identification is greatly improved over all, with respect to its precision and reliability.

As the preceding comments show, the precision and reliability of a character identification carried out according to the invention depend essentially on the nature of the information bits applied to the information carrier. Also, their distribution can contribute to the accuracy of the process. Accordingly, the solution of the problem on which the invention is based may be facilitated by a special type of device which serves to present information in the form of grouped information bits consisting of monochrome lines printed on a data carrier in linear arrangement parallel to one another according to a predetermined coding, with varying widths. This arrangement may be so fashioned that each information element is represented by an n-place group of lines which, at each place, has one of three possible line-widths. In this way, for example, numeric or alpha-numeric symbols may be represented, the number of places being chosen to meet the purposes of the specific-application.

With an arrangement of this kind of data bits on a data carrier in coded form, it is possible to prepare labels with a very high information density, without impairing the accuracy of character identification. Furthermore, a very advantageous character identification reliability is possible if the information bits of like character use at least all line-mark groups, for which the digital sums of the line-widths is the same as the digital sum or the sum measured transversely of the three different mark-widths, for, in order to locate simple errors it is merely necessary to form the digital sum of a group of three different line-widths. When the digital sum in question differs from the digital sum of three different line-widths, it may be stated with certainty that there is an error in the coding.

With the previously described arrangement of code symbols on a data carrier, made up of three different line-widths depending on the same transverse sum for all data elements, the case may arise in which not enough combination of three different line-widths are possible to meet the requirements of a given number of data elements. In that event, the previously described arrangement is expediently extended so that, in addition, use is made of the mark groups which contain, at each point, one of two possible line-widths, so that the largest of the three line-widths is eliminated and the corresponding digital sum of the line-widths is equal to the digital sum of the two different line-widths. In this way, this group of information elements involves those digital sums which differ from the previously mentioned digital sums by a greater amount than could be caused by a possible simple error.

Compensating double errors and double errors in the same sense, however, cannot be recognized with arrangements of the type described; for this purpose, a supplementary digital sum test must be carried out with all the data elements present in a data element group. The arrangement of information elements on an information carrier for the purpose of a particularly simple way of carrying out an evaluation according to the invention consists in closing each data element group at its start and its end with a mark of predetermined width which is the same for the beginning and end of all groups. In this way, a very simple evaluation becomes possible, for now it is made certain that, with any possible direction of scanning movement, a mark of a definite known width is picked up, so that no special relation of the line-widths to one another is required for determination of the final value of the line-width.

The speed of scanning can be found directly from the known width of the first line in each case and the time required to scan it. The resultant value is very accurate since it is based on the actually known width, without need for a relationship which is subject to error because of great speed differences. Thus, also, the width of the second scanned line can be determined very accurately, and from it another signal can be derived which gives the scanning speed of the second line with a corresponding accuracy.

The requirements for signal recognition are kept comparatively low, if the arrangement of the line-coded information bits are so chosen that every information bit is represented by a three-place line group. Thus, expediently, the line-widths are in the proportions 1:2:4 or 1:2, to simplify the evaluation of information with digital circuits.

A further analysis of the movement pattern of the reading stylus makes possible the mathematical determination of the probability with which, under unfavorable circumstances (unfavorable tolerance position of the line-widths and high accelerations) an erroneous evaluation of line-widths occurs. If more than two different line-widths are used, it is possible to fix certain line-widths with interrelations which are adapted to the probabilities with which a line mark-width is erroneously classified as a second adjacent one, or that a second is erroneously classified as a third adjacent line-width (thus all together lowering them).

DESCRIPTION OF THE DRAWINGS

In the following description, examples of signal recognition using the method of the invention will be described, making reference to the drawing, in which.

DESCRIPTION OF A PREFERRED EMBODIMENT

Figures 1, 2:
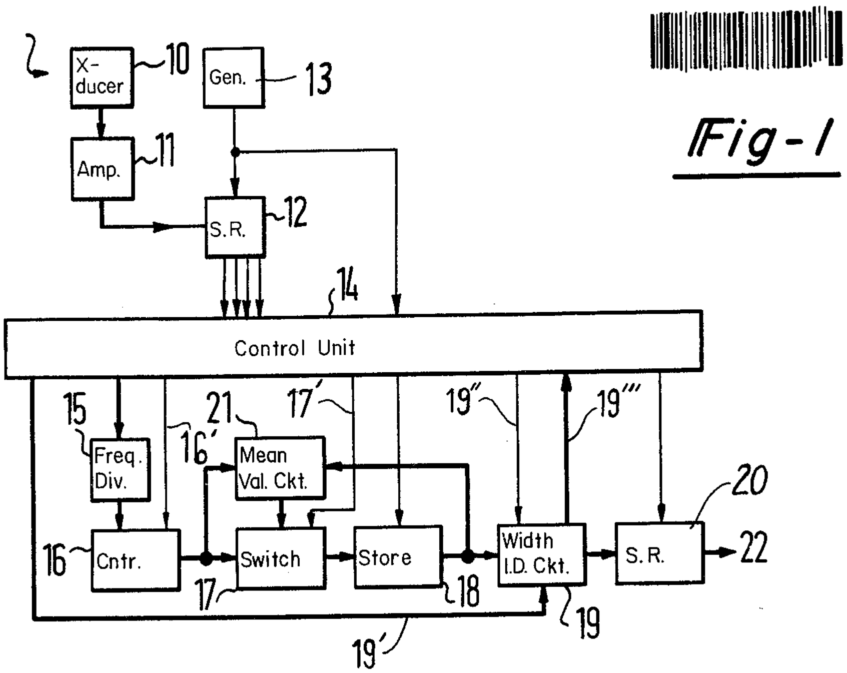
FIG. 1 is an example of a coded price label.
FIG. 2 shows a block diagram of a signal recognition device according to one embodiment of the invention.

FIG. 1 is an example of a coded information label. It is coded in black lines each of which may be of three predetermined widths namely "wide" ($w$), "medium" ($m$) or "thin" ($t$). Obviously the coding could be in any color (including white on black). Each element in the code consists of three consecutive lines. The first three elements (reading form left to right in the figure) are "start," "checking" and "length" signals, respectively, and the last three are "length," "checking" and "stop" signals, respectively, in both cases in the order stated. The part of the coded information between the first three and the last three elements is what is herein named the "data" information, e.g. of the price of goods to which the label is attached. Since each element is of three lines, there are $3^3$ or 27 possible combinations — more than enough to cover any selected numeral from 0 to 9, and the six elements already mentioned, which are, in the example, now being described, also numbers. If more combinations were required, it would, of course, be possible, to constitute each element by four lines. This would give $3^4=81$ combinations . . . and so on. However, in what follows, three line elements will, for simplicity, be assumed.

The "start" signal is, as the name implies, a predetermined preparatory signal ($w$, $t$, $m$, in this example) for setting the evaluation apparatus into a condition for evaluating following coded information: The "stop" signal ($t$, $m$, $w$) operates to restore the evaluating apparatus to its normal or rest condition; the "length" signals are alike, each represents the number of coded data elements between them; and the "checking" signals provide security against error, and, in coding, are so selected as, between them, to provide a number characteristic of the sum of all the numbers coded from end to end of the label. The whole coded label may be scanned in either direction i.e. from left to right or from right to left and, in accordance with practice known per se, independence of the direction of scanning is obtained by providing, in the evaluation apparatus, a storing and reverse counting arrangement, which, in the event of the "stop" signal coming first, in effect reverses the signal element sequence before feeding it on to subsequent evaluating apparatus. Since such arrangements are known per se, as also are arrangements for responding, as described, the "start" and "stop" signals and arrangement for giving a warning if the checking signals do not agree with the aforesaid sum, they will not be described in detail herein and any suitable such arrangements, as known per se, may be used in carrying out the invention.

FIG. 2 illustrates in block diagram form and so far as is necessary to an understanding thereof an arrangement for evaluating single color line-coded data. The coded label is manually scanned by a scanning head (not shown) such as a stylus or light pencil in a direction more or less at right angles to the lines and the resulting modulated reflected light is converted into length modulated electrical signals in a transducer 10 of any convenient known type. These signals are amplified and shaped in known manner by a shaping and amplifying circuit 11 which might for example include a Schmitt-Trigger circuit and the output from which consists of a series of pulses of constant amplitude. These are fed to a shift register 12 which receives as its shift inpur pulses from a generator 13 of constant predetermined pulse frequency e.g. 100 KHz. The shift register 12 has four output leads (in the example now being described) and the output on these leads determines in conjunction with the oscillator output, the control functions of control apparatus in block 14 operating as will be later described.

15 is a programmed frequency divider which receives from the generator frequency lead (not separately shown) in block 14, the frequency from 13. Over most of a scanning excursion this divider 15 has a fixed division ratio. However, as already explained, there is likely to be a substantial acceleration in scanning over the first part of an excursion of scanning e.g. over the first six lines or thereabouts. This could cause errors in evaluation of these first few lines and the divider 15 is therefore preferably programmed in accordance with a predetermined program to increase its division ratio in a series of steps over the first few lines (say six) of a scanning excursion. A suitable program of ratios which has been determined after experiment and analysis of human scanning speeds, and extending over the first six lines in six steps is 38/64; 40/64; 42/64; 44/64; 46/64; 48/64, remaining at the last ratio (48/64) over the remainder of the excursion. It will be noted that the final division ratio is not 1/1 but 48/64 (0.75). This, though not essential, is preferred because, as will be shown, it eliminates one step of calculation in subsequent line classification i.e. determination of whether a line is thick, medium or thin. If the scanning pencil is first placed on the label at a point well to one side of the recorded coding, so that the pencil scans a certain path length before reaching the coded material, the control apparatus in block 14 recognizes this and is arranged, either to render the programming of divider 15 inoperative or to reduce it so that the first division ratio is (for example) 44/64. Apparatus for this purpose is not per se part of this invention and is therefore not shown and will not be further described herein.

A counter 16 follows the counter 15 and counts the pulses which occur during the scanning of each line.

The control apparatus 14 preferably sets the counter 16 to zero at the beginning of each line count though it may be arranged to be reset at the end of each line count if desired. In either case this setting to zero is effected in dependence upon the state of the signals on the output leads from 12. The control input to counter 16 is represented by the direct connection 16' shown between 14 and 16.

The count achieved by the counter 16 will be a measurement of the time taken to cross a line and thus takes into consideration both the width of the line and the speed at which it has been crossed. Since the width of the first line is known and may be arranged to be always the same the count achieved in 16 in respect of this line is a measure of the speed at which this line has been crossed.

The count of 16 is passed through a two position switch 17, when in its normal position, to a store 18 the output of which is fed as one input to a mean value circuit the other input to which is the count in 16. In the other position of switch 17 the mean value from 21 is fed to the store 18 in place of the count in 16. The purpose of circuit 21 will be described later.

The control apparatus 14 gives a store command to the store 18 at the end of each line.

The contents of store 18 are transferred to a line width identification circuit 19 for establishing whether the line-width is wide (*w*), medium (*m*) or thin (*t*). As will be seen the contents of the store 18 will be a measure of the speed at which a line (the last preceding line) has been scanned. The unit 19 also receives over lead 19' an input which is essentially the same as that which is fed into unit 15. The unit 19 is in fact a downward counting counter which for each line is preset to a count representative of the speed of scanning of the preceding line (content of store 18). Over lead 19'' is given the command to store the content of store 18 and commence the down count. The unit 19 may for example comprise a modulo-n-counter which counts cyclically in descending fashion starting from a preset counting value and a following counter which counts "overflow counts" occurring after the modulo-n-counter has counted down to zero. The overflow counts are passed onto a shift register 20 which receives from unit 14 a shift pulse at the end of each line. Register 20 thus provides at its multiple outputs 22 a signal combination representative of a coded element. This is passed on to subsequent computing and recording apparatus (not shown) which records the elements of data information (e.g. as numerals); recognizes and secures response to the "start" and "stop" signals; recognizes and responds to the "length" signals; reverses the element sequence order if the "stop" signal comes first; and actuates a warning device if the "checking" signals indicate an error.

In addition the identification unit 19 feeds over line 19''' the line width information signal it produces to the control means 14 which utilizes the information differently according as to whether the line was *w*, *m* or *t*. If it was *w* the control apparatus feeds over lead 16' to the counter 16 a signal which divides the count by two. If it was m there is no effect. If it was t the apparatus 14 feeds over 16' a control signal which changes over the switch 17 to a position in which the circuit from 16 to 18 is opened and the circuit from 21 to 17 is closed. 21 is a mean value circuit forming the mean value of the inputs from 16 and 18. In this way there is produced from the scanning of each line a line width representative signal which enables the speed at which each line is scanned to be used as a "scale" or "reference" speed for enabling the line-width of the next line to be determined.

As will be seen errors which can result from certain tolerances in the line coding and which are most serious with the thinnest lines are eliminated.

Alternatively, the mean value circuit 21 can be constituted by an adding circuit if the functions required for forming a mean value are already in part performed in the region of the counter 16 or the stepping-down circuit 15. This may be done, for example, by halving the pulses fed to the counter 16. An allowance must be made for the mutual ratio of the line-widths, i.e. if these magnitudes are chosen appropriately the halving can be eliminated for certain line widths. This is dependent on the nature of the evaluation of the counting.

Figure 3:
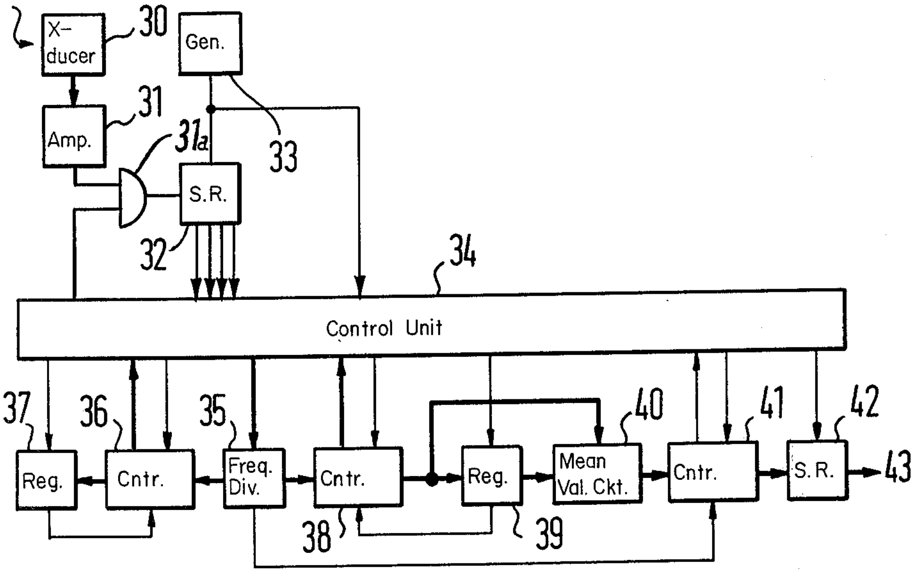
FIG. 3 shows a block diagram of a character recognition device according to a second embodiment of the invention, for line-coded information with fixed predetermined line group width.

FIG. 3 illustrates an embodiment for evaluating line coded data with fixed predetermined line group width i.e. fixed predetermined width from the beginning of the first line in a group or element to the end of the last line therein. In describing this embodiment it will again be assumed that each element consists of three lines and two spaces but of course this is not a limitation. In FIG. 3 the blocks 30, 31, 32 and 33 correspond respectively with the blocks 10, 11, 12 and 13 of FIG. 2 except that the generator 33 is of higher frequency, e,g, 3.2 MHz. 31a is an AND-gate receiving one input from 31 and the other from the control apparatus here referenced 34. The output from the AND gate provides an added control input to the unit 32.

The control apparatus 34 feeds the data signals to a divider 35 having three outputs the frequencies at which are always different and in a fixed relation to one another but which are changed in accordance with the operation state reached by the control apparatus at 34. The divider 35 furnishes cyclic pulses for three counters 36, 38 and 41 whose frequency relationships differ to correspond to particular operational states.

The first counter 36 fed from the divider 35 counts the number of cyclic pulses occurring during the scanning of each line. This counter is controlled by the control means 34 in respect of its various functions, start, stop, pre-setting and re-setting.

The counting level in the counter 36 is directly proportional to the width of the respective scanned line and inversely proportional to the mean scanning speed over the line. Following the scanning of each line the count in the counter 36 is intermediately stored in a register 37 in response to a command signal from the control means 34. The second counter 38 is controlled by the control means 34 in such a way that it counts the cyclic pulses which occur during the scanning of a line group or element consisting, for example, of three lines and two spaces in between. This width is the same for all elements except for the printing tolerances. At the end of the scanning of an element the count in the counter 38 is directly proportional to the width of this element and inversely proportional to the mean speed of scanning over the region of the whole element.

If the counting frequency of the counter 38 is chosen to be in a certain ratio to the counting frequency in the counter 36, then the count in the counter 38 can be used directly as the classification limit for determining the line width at the end of scanning of a group of lines or element. The achievement of the functions so far described is obtained by the control of unit 35 by the control unit 34.

Following scanning of an element there will be available information characterizing the width of the element and three informations characterizing the respective individual line widths in binary form. The counter 38 feeds into a register 39 for storing the information stating the element width the other informations are stored in the registers 37 and 39 which characterize the width of the preceding element (register 39) and the individual line width of the last line of the preceding line element (register 37).

At this point in time the operation of classifying the individual line widths commences. For this purpose the counter 36 is pre-set by the register 37 using the width value of the last line of the preceding element. Similar action takes place as respects the register 39 and the counter 38.

The control means 34 controls the counter 36 and the divider 35 and the counter 36 counts down with a suitable counting frequency starting from its pre-set value.

There is produced a series of derived value signals which are such as to eliminate superimposed scanning speed variations. This is done by the circuit 40 as follows: Call the time taken to scan two successive elements $x_0$ and $x_1$. The width of the middle line in the first of these elements is obtained with reference to a derived value proportional to $x_0$. That of the next line is obtained with reference to a derived value proportional to $(2x_0 + x_1)/3$. That of the next line (the first in the second element) is obtained with reference to a derived value proportional to $(x_0 + 2x_1)/3$ . . . and so on with repetition of this three step process.

These derived values preset a modulo-n-counter which is in the identification circuit 41 and, which starting from this value, counts in descending fashion and, on passing through zero, is freshly charged with this value. This cyclic charging and counting operation is continued at appropriate speed until the counter 36 passes through zero. The zero passages of the modulo-n-counter are counted, for example, in the control means 34 or with a series-connected transfer counter (not shown) and their number characterises the width classification of the now evaluated line. The result of the evaluation is stored intermediately in the output of a shift register 42 which is the counterpart of the register 20 of FIG. 2.

The entire result of evaluation of an element together with the classification of the third and last line of the preceding element is contained in the register 42, e.g. in binary form. This information is fed away via the output lead 43 for further processing as before.

The arrangement shown in FIG. 3 serves for evaluating line groups or elements of constant width. The length of the path of the scanning pencil on the data carrier displays the same tolerances as the individual lines, and because of this, a greater evaluation accuracy and reliability can be achieved as compared with the results obtained with the embodiment of FIG. 2.

The divider 35 can in addition to the above described functions perform the function, described for the arrangement according to FIG. 2, of reducing the line width signals by a given percentage in order to avoid harmful effects due to accelerations in the scanning pencil. Its direct connection with the identification circuit 41 can lead to an adaptation of the mode of working of the identification circuit 41 to the frequency relationships that are respectively adjusted with the divider 35.

We claim:

1. A method of evaluating data in the form of parallel data lines of varying width printed serially on a data carrier and of width varied in accordance with a predetermined coding, said method comprising the steps of:

a. moving a transducer, said transducer sensitive to the alternating contrast between the data carrier and the data lines and adapted to produce an output corresponding to said alternating contrast, across said data lines and generally perpendicular thereto wherein said transducer output corresponds in a time sequence to the distribution of said data lines, b. comparing said transducer output with a fixed frequency reference signal, c. storing the result of said comparison for a predetermined time period at least equal to the time required to move the transducer over a predetermined number of said data line or lines, d. identifying the character of the scanned data line or lines as to its or their width encoding, and e. utilizing the character identification in conjunction with said stored comparison to restore a new comparison for said character identification of succeeding data lines this rendering said character identification substantially independent of scanning speed variation.

2. A method as claimed in claim 1, wherein the result of the comparison of the thinnest line is fed to a mean value circuit together with the result of the comparison of the respective preceding line, the mean value signal thus obtained being utilized for the production of a signal characterizing the line width.

3. A method as claimed in claim 1, for evaluating groups of lines of given width and numbers of lines, wherein the resultants of the comparisons of lines belonging to one line group are in each case stored until this group of lines has been scanned, the signal obtained from the scanning of each line being in each case compared with a signal obtained by scanning of the adjacent line group.

4. A method as claimed in claim 3, wherein the line group signal is stored and, before comparing it with a signal obtained from the scanning of each line, is fed to a derived signal forming circuit together with a signal characterizing at least a part of the width of an adjacent line group.

5. A method as claimed in claim 4, wherein the formation in each case of the derived signal value ensues with a part of the width of an adjacent line group which is dimensioned to be proportional to the displacement from the central position of the respective line to be evaluated.

6. A method as claimed in claim 1, wherein at least the resultant of the comparison derived from scanning of the first line is, in respect of its value representative of the speed of the scanning movement, reduced by a percentage corresponding approximately to the expected acceleration of manual scanning movement over the region of the respective line.

7. A method as claimed in claim 6, wherein the percentage reduction is made in dependence on a signal representative of a predetermined minimum period of time or by the passage of the scanning head over a predetermined minimum path length between setting that head down in the plane of the scanning movement and the commencement of the scanning of the first line by said element.

8. Apparatus for carrying out the method defined in claim 1, comprising a transducer, said transducer sensitive to the alternating contrast between the data carrier and the data lines and adapted to produce an output corresponding to said alternating contrast, means for comparing said transducer output with a fixed frequency reference signal, means for storing the result of said comparison for a predetermined time period at least equal to the time required to move the transducer over a predetermined number of said data line or lines, means for identifying the character of the scanned data line or lines as to its or their widths encoding, and means for utilizing the character identification in conjunction with said stored comparison to restore a new comparison for said character identification of succeeding data lines thus rendering said character identification substantially independent of scanning speed variation, wherein signals produced by the transducer are fed to the first input of an AND-gate and the output from a fixed frequency pulse source is fed to the second input of the AND gate and the output of the AND-gate is fed into a counter in parallel with an identification circuit which, in dependence on the count in the counter, provides a signal representative of the width of a respective scanned line.

9. Apparatus as defined in claim 8, wherein there is provided, in series before the counter, a stepping-down circuit.

10. Apparatus as claimed in claim 9, wherein the stepping-down circuit is adapted to be varyingly programmed to suit a given type of scanning movement with which the lines canned in succession are expected to be scanned.

11. Apparatus as claimed in claim 8, wherein the counter is linked with the identification circuit via a register adapted and arranged to provide a scanning speed "scale."

12. Apparatus as claimed in claim 11, wherein an electrical switching circuit is provided between the counter and the register, said switching circuit being adapted and arranged to connect the input of the register to a mean value circuit in dependence on the signal provided by the identification circuit, said switching circuit being arranged to be actuated by the respective output signal from the counter.

13. Apparatus as claimed in claim 11, wherein control means are provided to control and assess the counter, the register and the identification circuit, said control means being, in turn, controlled by output from the fixed frequency source.

14. Apparatus as claimed in claim 8, wherein the identification circuit is constituted by a modulo-n-counter and a transger counter connected in series with and behind the same.

15. Apparatus for carrying out the method as defined in claim 1, comprising a transducer, said transducer sensitive to the alternating contrast between the data carrier and the data lines adapted to produce an output corresponding to said alternating contrast, means for comparing said transducer output with a fixed frequency reference signal, means for storing the result of said comparison for a predetermined time period at least equal to the time required to move the transducer over a predetermined number of said data line or lines, means for identifying the character of the scanned data line or lines as to its or their width encoding, and means for utilizing the character identification in conjunction with said stored comparison to restore a new comparison for said character identification of succeeding data lines thus rendering said character identification substantially independent of scanning speed variation, wherein the signals from the transducer are operatively linked with the output from a fixed frequency pulse source by means of an AND gate the output signals from which are fed to first and second counters via a control means, the first of said counters being arranged to count pusles associated with a respective scanned line and the second being arranged to count the pulses associated with a respective scanned line group, each counter feeding into one or other of two registers being connected via the control means with an identification circuit adapted and arranged to provide signals representative of the width of each respective scanned line in dependence on the mutual ratio of the counts by the counters.

16. Apparatus as defined in claim 15, wherein a stepping-down circuit is interposed between the control means and each of the two counters.

17. Apparatus as claimed in claim 16, wherein the stepping-down circuit is adjustable by the control means to definite relationships, in respect of the pulses fed to the counters, which relationships correspond with predetermined ratios between the line widths used and the line group widths used.

18. Apparatus as claimed in claim 15, wherein the identification has a mean value determining circuit connected in series ahead of it, said mean value determining circuit being fed with the count from the second counter which evaluates the line group and with the content of the store of the register into which the second counter feeds.

19. Apparatus as claimed in claim 18, wherein the mean value determining circuit is constituted by an adding circuit.

* * * * *

UNITED STATES PATENT AND TRADEMARK OFFICE

Certificate

Patent No. 3,927,303 Patented December 16, 1975

Norbert Wefers, Uwe Militz, Uwe Unglaube and Joachim Schwarzkopf

Application having been made by Norbert Wefers, Uwe Militz, Uwe Unglaube and Joachim Schwarzkopf, the inventors named in the patent above identified, and Nixdorf Computer AG, Paderborn, West Germany, the assignee, for the issuance of a certificate under the provisions of Title 35, Section 256, of the United States Code, deleting the name of Joachim Schwarzkopf as a joint inventor, and adding the name of Jan de Meer as a joint inventor, and a showing and proof of facts satisfying the requirements of the said section having been submitted, it is this 23rd day of May 1978, certified that the name of the said Joachim Schwarzkopf is hereby deleted from the said patent as a joint inventor, and that the name of Jan de Meer is hereby added to the said patent as a joint inventor with the said Norbert Wefers, Uwe Militz and Uwe Unglaube.

FRED W. SHERLING,
*Associate Solicitor.*

UNITED STATES PATENT OFFICE
CERTIFICATE OF CORRECTION

PATENT NO. : 3,927,303

DATED : December 16, 1975

INVENTOR(S) : Norbert Wefers et al

It is certified that error appears in the above-identified patent and that said Letters Patent are hereby corrected as shown below:

Col. 8, line 28, delete "inpur" and insert --input--

Col. 13, line 13, delete "widths" and insert --width--.

Signed and Sealed this

*Twenty-fifth* Day of *September 1979*

[SEAL]

*Attest:*

LUTRELLE F. PARKER

*Attesting Officer* *Acting Commissioner of Patents and Trademarks*